United States Patent

[11] 3,578,908

[72] Inventor William R. Tompkins
Pacific Beach, Calif.
[21] Appl. No. 781,557
[22] Filed Dec. 5, 1968
[45] Patented May 18, 1971
[73] Assignee Cohu Electronics, Inc.
San Diego, Calif.

[54] AUTOMATIC PEAK VIDEO CONTROL SYSTEM
14 Claims, 9 Drawing Figs.

[52] U.S. Cl. .......... 178/7.2
[51] Int. Cl. .......... H04n 5/19
[50] Field of Search .......... 178/7.1, 7.2, 7.2 (E), 7.1 (DC); 325/319, 404, 410, 159, 187; 315/10

[56] References Cited
UNITED STATES PATENTS

| | | | |
|---|---|---|---|
| 2,833,957 | 5/1958 | Horowitz | 178/7.2 |
| 3,102,163 | 8/1963 | Sennhenn | 178/7.1DC |
| 3,102,924 | 9/1963 | Legler | 178/7.2 |
| 3,206,547 | 9/1965 | Leitich et al. | 178/7.2E |
| 3,339,018 | 8/1967 | Brown | 178/7.2 |

*Primary Examiner*—Richard Murray
*Assistant Examiner*—Alfred H. Eddleman
*Attorney*—Lyon & Lyon

ABSTRACT: An automatic peak video control system for vidicon tubes in which the peak level of the video signal is detected and stored during each field scan of the vidicon. The detected signal is sampled, compared with a reference voltage, and applied to the input of an integrating amplifier which controls the target voltage of the vidicon in a manner such that the error between the peak video signal and the reference voltage will be reduced toward zero.

INVENTOR.
WILLIAM R. TOMPKINS
BY
Lyon & Lyon
ATTORNEYS

INVENTOR.
WILLIAM R. TOMPKINS
BY Lyon & Lyon
ATTORNEYS

INVENTOR.
WILLIAM R. TOMPKINS
BY Lyon & Lyon
ATTORNEYS

AUTOMATIC PEAK VIDEO CONTROL SYSTEM

BACKGROUND OF THE INVENTION

In some television cameras, it is necessary for the operator to constantly readjust the camera output in order to provide the most pleasing brightness level in the televised scene. It is extremely difficult, if not impossible, for an operator to maintain an optimum level at all times, especially when scene changes occur frequently. To overcome this limitation, many cameras are provided with an automatic light level control which measures the average light over the entire scene area and adjusts the target potential on the camera vidicon tube to produce a constant average video signal amplitude. That is, the average video signal amplitude is maintained at a constant level with relation to the black level. This type of compensating system works satisfactorily except when black areas dominate the scene, and particularly where the dark area increases rapidly. When this happens the averaging type of automatic target control drives the target potential excessively high in an effort to compensate for the low average brightness level even though the actual brightness level of the white areas of the scene was satisfactory. This results in the brightest portions of the televised scene being abnormally bright.

SUMMARY OF THE INVENTION

According to the present invention, a system is provided for maintaining the brightness level of a televised scene at a desired value regardless of changes in area of the scene. This is accomplished by sensing the peak video signal and providing a feedback signal for controlling the target voltage in response to the peak level to maintain a desired difference between the peak video level and the black level. In order to cause the target voltage to substantially instantaneously respond to a change in light level, the peak video signal is detected and stored each field scan of the vidicon and the stored level is sensed once each field to provide a continuously updated control voltage. This stored voltage is compared with a reference voltage and applied to a high gain integrating amplifier, the output of which controls the target potential such that the error between the stored and reference voltages will be driven to zero. As a result of the system of the present invention, the brightness level of the televised scene remains at a constant desired value regardless of scene changes.

It is therefore an object of the present invention to provide an improved system for maintaining a desired brightness level on a televised scene.

Other objects and advantages of the present invention will become more apparent upon reference to the accompanying description and drawings in which:

DESCRIPTION OF THE INVENTION

Figures 1, 6, 7:
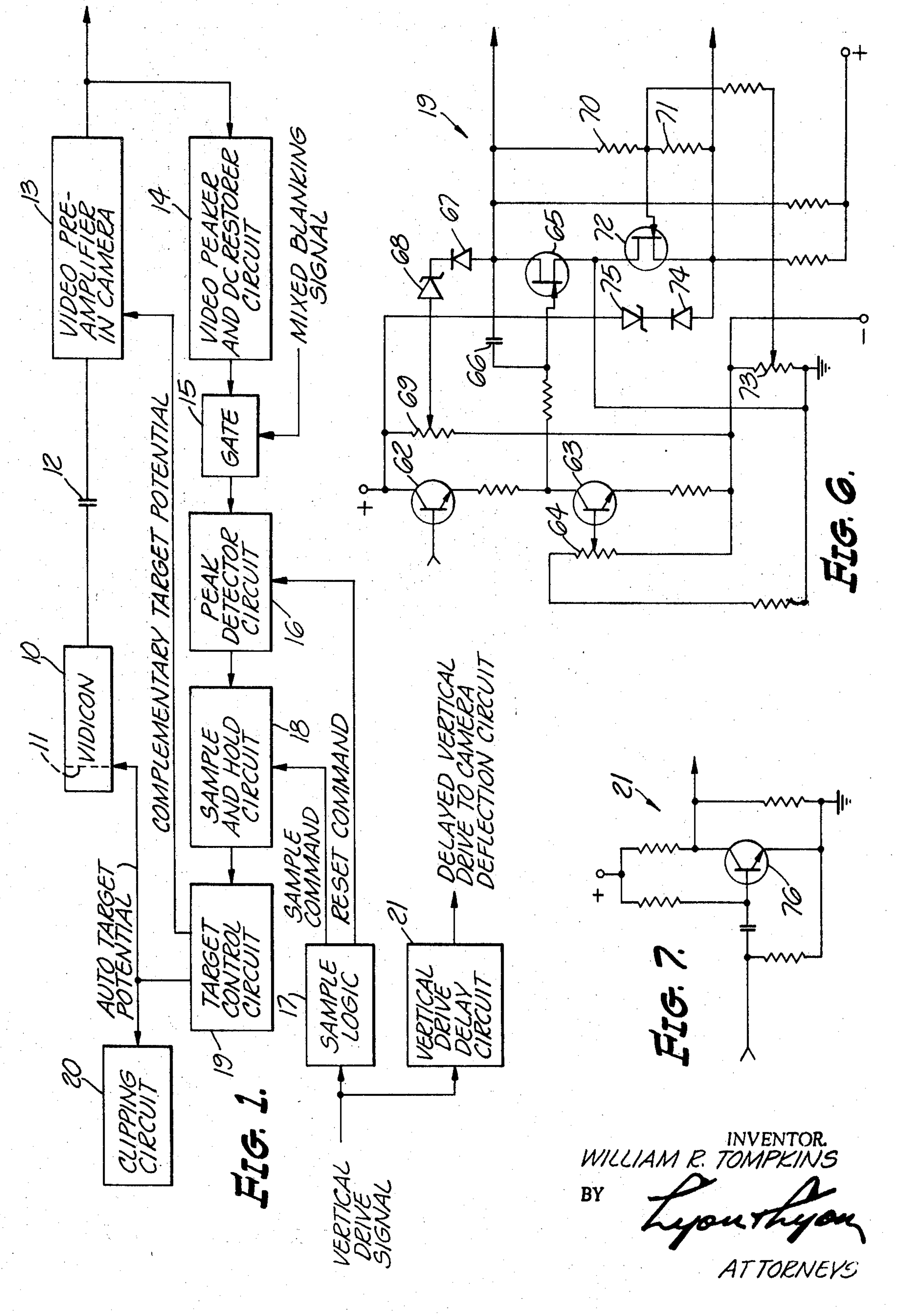
FIG. 1 is a block diagram showing the system of the present invention.
FIG. 6 is a schematic diagram of a target control circuit according to the present invention.
FIG. 7 is a schematic diagram of a vertical drive delay circuit according to the present invention.

FIG. 1 shows in block diagram form the system of the present invention. A vidicon 10 having a target 11 is connected by a capacitor 12 to a video preamplifier 13 which conventionally makes up part of the television camera. The video signal appearing at the output of the preamplifier 13 is fed to the remainder of the camers's circuitry and is also fed to a video peaker and DC restorer circuit 14. This circuit emphasizes the high frequency components in the video signal to compensate for high frequency rolloff occurring in the camera preamplifier and establishes a DC reference level for the video signal. This DC level, which corresponds to the voltage level present at the camera output when black elements of the scene are being televised, is lost in the preamplifier due to use of capacitive coupling.

After the DC reference level is restored to the video signal, it is passed to a gate 15. The gating input of the gate 15 receives the mixed blanking signal from the camera control and prevents the video signal from passing into a peak detector circuit 16 during the occurrence of horizontal and vertical blanking pulses. This eliminates from the peak detector circuit 16 spurious signals which are generated at the vidicon during retrace. At the output of the gate 15, the video signal is positive with respect to the restored DC reference level and appears only during times when the camera is actively scanning. The peak detector circuit 16 stores a voltage corresponding to the peak level of the video signal during each field scan. Sample logic 17 is provided for applying a reset command to the peak detector circuit 16 during the vertical blanking interval at the end of each field so that this detector is prepared to detect the peak level of the next field. Just prior to the resetting of the peak detector circuit 16, and upon receipt of a sample command from a sample logic 17, a sample and hold circuit 18 measures the peak level stored in the peak detector circuit 16 and applies a DC voltage proportional to this level to a target control circuit 19.

In the target control circuit 19 the sample voltage is compared with a reference voltage and any difference detected is applied to a high gain integrating amplifier. The output of this amplifier controls the vidicon target potential to minimize any difference. The target potential thus becomes less positive when the peak brightness increases and vice versa. A clipping circuit 20 is provided to limit the potential applied to the target 11 of the vidicon 10 in the event that a large transient occurs, for example, if the scene is black and then suddenly gets bright. The clipping circuit 20 is adjusted to clip the servo voltage when it slightly exceeds the maximum desired voltage.

The target control circuit 19 also produces a complementary target potential which is applied to the preamplifier 13. Variations in this potential due to changes in peak scene brightness are equal but opposite in direction to those occurring in the automatic target potential. The complementary target potential is applied to the input of the preamplifier 13 at one side of the coupling capacitor 12, the other side of which is connected to the vidicon target and to the automatic target voltage terminal. By applying these two opposing potentials to opposite sides of the capacitor 12 variations in target potential are prevented from introducing AC feedback into the preamplifier.

A vertical drive delay circuit 21 is used to invert the polarity of the vertical drive pulses from the remote camera control (which also drive the sample logic 17) before they are allowed to pass onto the deflection circuits in the camera. This makes it possible for the trailing edges of the pulses instead of the leading edges to be used to initiate vertical retrace at the vidicon. By introducing this delay, vertical retrace is prevented from starting until the vidicon beam is completely cut off. If this were not done spurious signals generated by the vidicon at the end of each field might adversely affect the response of the automatic peak video control. In the sample logic 17 the vertical drive signal from the remote camera control is used to generate two accurately timed pulses during the vertical blanking interval at the vidicon. These two pulses serve as the sample command and the reset command previously referred to.

Figure 2:
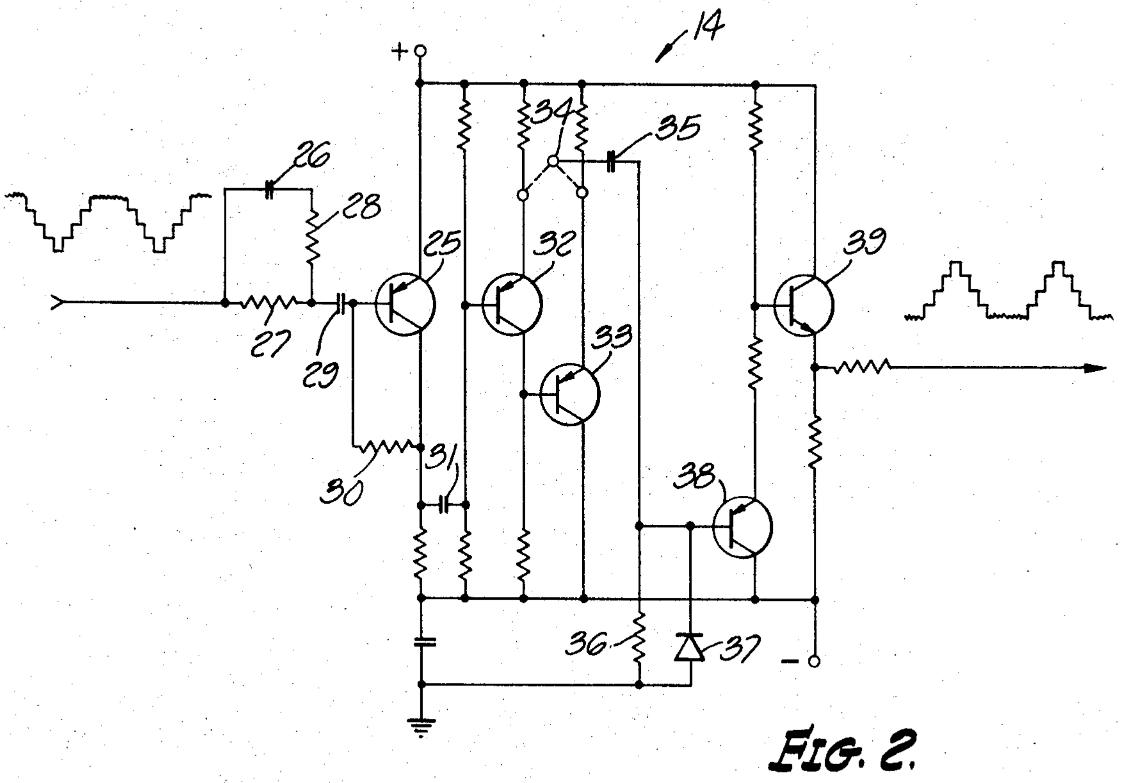
FIG. 2 is a circuit diagram showing a video peaker and DC restoration circuit according to the present invention.

Turning now to FIG. 2, the details of the video peaker and DC restorer circuit 14 are shown. The video signal from the output of the preamplifier 13 is applied to the base of a transistor 25 through a high frequency peaking network comprising capacitor 26 and resistors 27 and 28, and a coupling capacitor 29. The transistor 25 operates as a feedback amplifier with the gain determined by the ratio of a feedback resistor 30 to the impedance of the high frequency peaking circuit. Below approximately 100 kilohertz the capacitor 26 has no effect and the amplifier gain is low. Above 100 kilohertz the gain increases. The amplified signal from the transistor 25 is coupled by a capacitor 31 to the base of a transistor 32. The transistor 32 is connected as a phase splitter with unity gain, that is, at the collector of the transistor 32 the signal is 180° out of phase with the signal at the base. At the same time, the signal at the emitter is in phase with the signal at the base.

The out of phase signal at the collector drives an emitter follower transistor 33 and a jumper 34 is provided which can be connected to the emitter circuit of either the transistor 32 or the transistor 33 depending on whether or not the video signal from the camera preamplifier 13 is positive or negative in the white direction. Whichever signal is selected is applied to a DC restorer circuit consisting of a capacitor 35, a resistor 36 and a diode 37. On negative swings of the signal, the diode 37 conducts and charges the capacitor 35. Because of the high resistances of the resistor 36 and the base of a transistor 38 which is coupled to the diode 37, these being the only paths through which the capacitor 35 can discharge, a charge corresponding to the black level of the video signal is maintained on the capacitor 35. The video signal is superimposed on this voltage and the combined signal is transferred to the gate 15 by a two-state emitter follower circuit made up of the transistors 38 and 39. Two emitter followers are used in series in the output stage to minimize loading on the DC restorer circuit.

Figure 3:
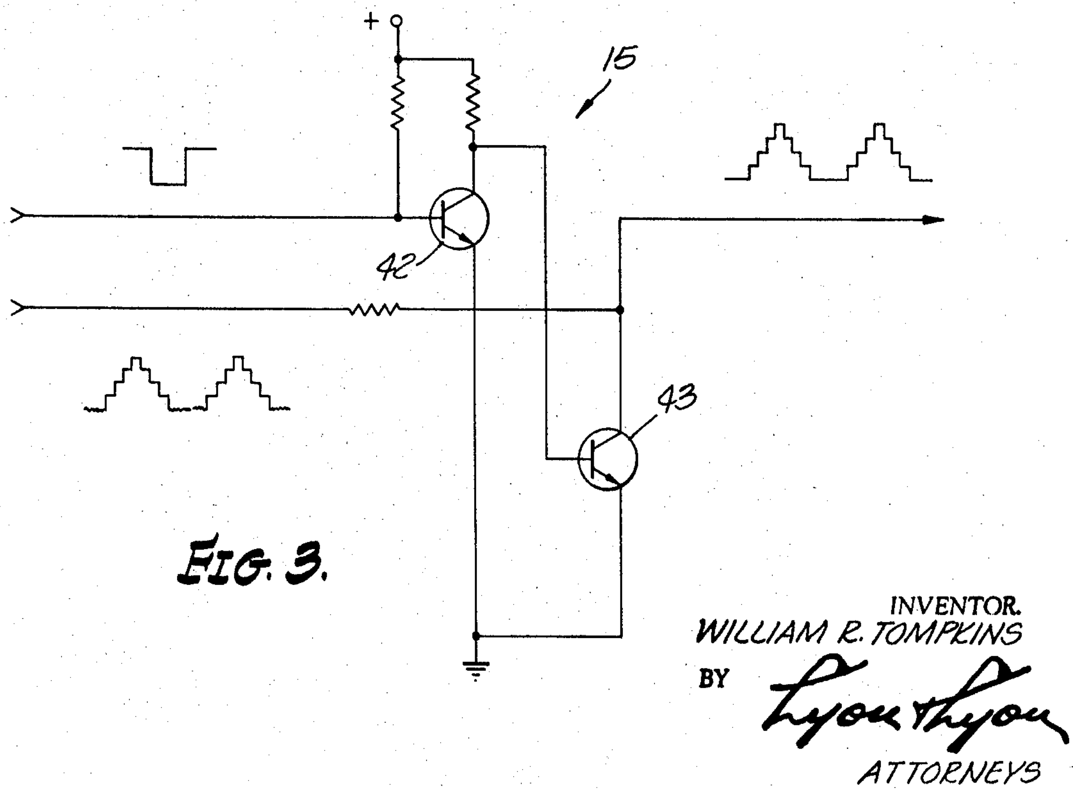
FIG. 3 is a schematic diagram of a gating circuit according to the present invention.

The output from the emitter follower 39 is applied to the gate circuit shown in FIG. 3. This circuit is essentially a two-stage switch with an emitter follower input 42 for receiving the mixed blanking signal from the remote camera control. The second stage, comprising the transistor 43, is connected between ground and the output of the emitter follower 39, that is, the output of the video peaker and DC restorer circuit. When no blanking signal is applied to the transistor 42 this transistor conducts and reverse biases the transistor 43 with the result that this switch is effectively out of the circuit and the video signal is allowed to pass on to the peak detector circuit 16. When a negative going blanking signal containing vertical and horizontal blanking pulses is applied to the base of the transistor 42, this transistor stops conducting and drives transistor 43 into saturation. This puts the collector of the transistor 43 at approximately the same level as its emitter which is grounded. This grounding action during horizontal and vertical blanking periods removes any extraneous noises injected into the video signal during retrace times.

Figures 4, 4A, 5, 5A:
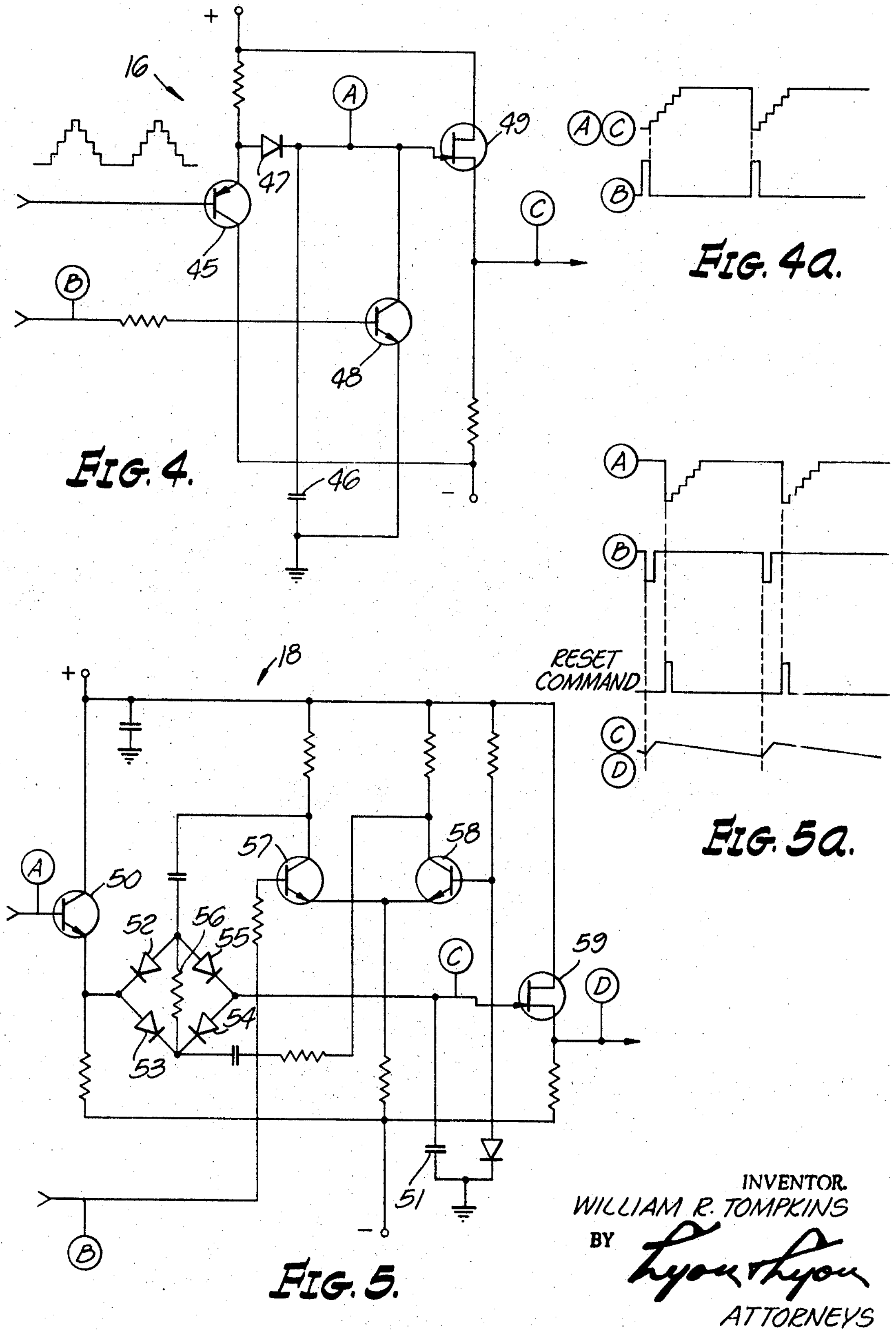
FIG. 4 is a schematic diagram of a peak detector circuit according to the present invention.
FIG. 4*a* shows the waveforms present at various points in the circuit of FIG. 4.
FIG. 5 is a schematic diagram of a sample and hold circuit according to the present invention.
FIG. 5*a* shows the waveforms present at various points in the circuit of FIG. 5.

The output of the gate circuit 15 is applied to the peak detector circuit 16 shown in FIG. 4. The video signal is applied to the base of a transistor 45 which is connected as an emitter follower and which serves as a high current signal source. On positive swings of the video signal the emitter of the transistor 45 also goes positive and charges a capacitor 46 through a diode 47. The charging circuit is provided with a short time constant so that the capacitor 46 will always charge to the peak value of the video signal during each field. Because the resistance of the discharge path of the capacitor 46 is very high, the peak charge is retained for the duration of the field. At the end of each field, the capacitor 46 is discharged by a transistor 48 which is driven into conduction from a reset command in the form of a positive pulse from sample logic 17. An emitter follower output stage comprising a field effect transistor 49 transfers a DC voltage level proportional to the charge in the capacitor 46 to the sample and hold circuit 18.

The sample and hold circuit 18 is shown in FIG. 5. The DC output voltage from the transistor 49 is applied to the base of an emitter follower transistor 50 which serves as a low impedance voltage source for a capacitor 51. Between the emitter of the transistor 50 and the capacitor 51 there is connected to a diode gating circuit consisting of diodes 52, 53, 54 and 55 and resistor 56. During a field scan at the vidicon the biasing on the diodes is such that current cannot flow from the emitter follower 50 into the capacitor 51. When a sample command from the sample logic 17 in the form of a negative pulse is received at the base of a transistor 57 at the end of a field scan the transistor 57 stops conducting for the duration of the pulse and drives transistor 58 into conduction. The resulting pulses at the collectors of these two transistors enables the signal at the emitter of transistor 50 to charge capacitor 51 through the diode gate. Capacitor 51 charges to a level corresponding to the peak value of the DC voltage supplied by the peak detector circuit 16. A field effect transistor 59 connected as an emitter follower transfers the potential on the capacitor 51 to the target control circuit 19 shown in FIG. 6.

The target control circuit shown in FIG. 6 generates a vidicon target potential which automatically increases or decreases to compensate for variations in the peak light levels of the scenes being televised. The output of the transistor 59 and the sample and hold circuit 18 is applied to the base of a transistor 62 connected as an emitter follower. In the emitter circuit of the transistor 62, this DC voltage level is added to or subtracted from a preset reference level established by a transistor 63 and a potentiometer 64 which is connected across a source of negative voltage. The difference or error between these two voltages is amplified by a high gain integrating amplifier comprising a field effect transistor 65 and a feedback capacitor 66. The auto target potential is taken from the transistor 65 and changes in this potential will be proportional to the average of changes in potential at the input of the transistor 65 since the transistor 65 operates as an inverting amplifier due to the presence of the capacitor 66 between its drain and gate terminals. A field effect transistor is used to compensate for nonlinearity of the vidicon and permit the use of a high gain feedback system over all light levels without causing oscillation. The maximum target potential that can appear at the output of the transistor 65 is limited by diode 67, Zener diodes 68 and potentiometer 69. The potentiometer 69 is used to set the back bias of the Zener diode 68. The diodes make up the clipping circuit shown at 20 in FIG. 1. Limiting the maximum target potential improves large signal transient recovery time although at the expense of reduced range of regulation.

The auto target potential is also applied through a voltage divider made up of resistors 70 and 71 to the input of a field effect transistor 72. This transistor operates as an inverting linear amplifier. The output voltage of the transistor 72 is equal but opposite in direction to that of the output of the transistor 65. The operating point of the transistor 72 is adjusted with a potentiometer 73 and a clipping circuit comprising diode 74 and Zener diode 75 limits the maximum complementary target potential to the maximum auto target potential. As stated previously, by applying opposing potentials to the two sides of the coupling capacitor 12, any AC variations are cancelled and prevented from causing closed loop oscillations.

The vertical drive delay circuit 21 is shown in FIG. 7. The use of this circuit is necessary when the automatic peak video detector is used to delay vertical drive in order to delay vidicon vertical deflection with respect in mixed blanking. This minimizes the possibility of actuating the automatic peak video control with spurious information due to vidicon overscan. This delay is effectively produced by inverting the polarity of the vertical drive pulse with a transistor 76 which operates as a saturating inverting amplifier. At the collector of the transistor 76 the signal is a positive going pulse. The signal is routed to the camera deflection circuits where its trailing negative going edge initiates the vertical retrace period.

The circuitry of the sample logic 17 is conventional and no detailed description of it is believed necessary. The various waveforms appearing at different points of the circuit are illustrated at these points or in separate figures for convenience in understanding the operation of the circuit.

While the present invention has been described in connection with the light level of a vidicon tube, it should be understood that it would be equally useful for use with other types of tubes. For example, the output of the target control circuit 19 could be used to control a motor driving a variable iris of the type often used to control the light level of various types of camera tubes. The invention thus may be embodied in other specific forms not departing from the spirit or central characteristics thereof. The present embodiments are therefore to be considered in all respects as illustrative and not restrictive, the scope of the invention being indicated by the appended claims which come within the meaning and range of equivalency of the claims are therefore intended to be embraced therein.

I claim:

1. An automatic peak-video control system for a camera tube having light level controlling means and a video signal output comprising:

means for sensing the peak level of said video signal output during each field scan of said camera tube, said sensing means comprising a peak detector circuit for receiving said video signal output and sampling means coupled to said peak detector circuit for sampling the signal therein at least once during each field scan of said tube;

means coupled to said sensing means for producing a voltage for controlling said light level controlling means in response to said sensed peak level; and means for decoupling said peak detector circuit from said video signal output during the blanking interval of said video signal.

2. The system of claim 1 further comprising logic means for causing said sampling means to sample and for resetting said peak detector circuit during the vertical blanking interval of said video signal.

3. The system of claim 1 wherein said camera tube comprises a vidicon and said light level controlling means comprises the target of said vidicon.

4. The system of claim 3 further comprising means coupled between said vidicon and said peak detector circuit for restoring a DC level to said video signal.

5. The system of claim 1 wherein said controlling means comprises means for providing a reference signal, means for comparing said sensed peak level with said reference signal, and amplifier means for amplifying the difference therebetween, the output of said amplifier means comprising said control voltage.

6. The system of claim 5 wherein said camera tube comprises a vidicon, said light level controlling means comprises the target of said vidicon, and said control voltage comprises the target voltage of said vidicon.

7. The system of claim 6 further comprising clipping means coupled to said amplifier means for limiting the magnitude of said target voltage to a predetermined value.

8. An automatic peak-video control system for a camera tube having light level controlling means and a video signal output comprising:

means for sensing the peak level of said video signal output during each field scan of said camera tube;

means coupled to said sensing means for producing a voltage for controlling said light level controlling means in response to said sensed peak level;

means for producing a complementary voltage equal in magnitude but opposite in polarity to said control voltage; and means for applying said complementary voltage to said sensing means.

9. The system of claim 6 wherein said amplifier means comprises a field effect transistor.

10. An automatic peak-video control system for a camera tube having light level controlling means and a video signal output comprising:

means for sensing the peak level of said video signal output during each field scan of said camera tube, said sensing means comprising a peak detector circuit for receiving said video signal output and sampling means coupled to said peak detector circuit for sampling the signal therein at least once during each field scan of said tube;

means coupled to said sensing means for producing a voltage for controlling said light level controlling means in response to said sensed peak level;

logic means for causing said sampling means to sample and for resetting said peak detector circuit during the vertical blanking interval of said video signal, said logic means being responsive to vertical drive pulses; and means responsive to said drive pulses for delaying vertical retrace of said tube.

11. An automatic peak-video control system for a vidicon camera tube having a target the target voltage of which controls the light level of said vidicon and a video signal output comprising:

means for sensing the peak level of said video signal output during each field scan of said vidicon tube;

means coupled to said sensing means for controlling the target voltage of said vidicon, said controlling means comprising means for providing a reference signal, means for comparing said sensed peak level with said reference signal, and amplifier means for amplifying the difference therebetween, the output of said amplifier means comprising said target voltage; and means coupled to said amplifier means for producing a complementary voltage equal in magnitude but opposite in polarity to said target voltage.

12. The system of claim 11 further comprising a capacitor coupled to the output of said vidicon, and means coupling said complementary voltage to the side of said capacitor remote from said vidicon.

13. The system of claim 12 wherein said sensing means includes an amplifier for receiving said video signal output and wherein a capacitor is provided for coupling said amplifier to said tube, said complementary voltage being applied to said amplifier on the side of said capacitor remote from said tube.

14 The system of claim 13 wherein said tube is a vidicon and said control voltage is the target voltage of said vidicon.